J. B. WOODWORTH.
VALVE.
APPLICATION FILED NOV. 14, 1910.
1,010,837.
Patented Dec. 5, 1911.
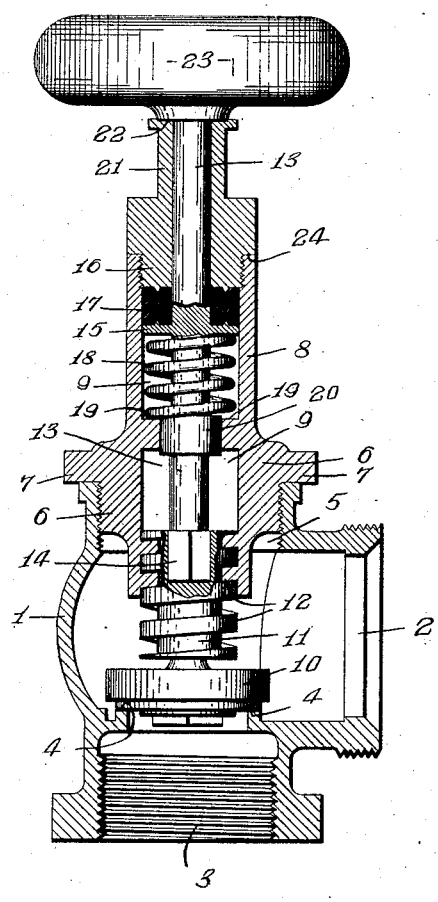

UNITED STATES PATENT OFFICE.

JOHN B. WOODWORTH, OF SYRACUSE, NEW YORK, ASSIGNOR TO THE SYRACUSE FAUCET & VALVE COMPANY, OF SYRACUSE, NEW YORK, A CORPORATION OF NEW YORK.

VALVE.

1,010,837. Specification of Letters Patent. Patented Dec. 5, 1911.

Application filed November 14, 1910. Serial No. 592,139.

*To all whom it may concern:*

Be it known that I, JOHN B. WOODWORTH, of Syracuse, in the county of Onondaga and State of New York, have invented a certain new and useful Valve, of which the following is a specification.

This invention has for its object the production of a particularly simple and efficient valve in which the movable parts are easily accessible; and it consists in the combinations and constructions hereinafter set forth and claimed.

In describing this invention reference is had to the accompanying drawing which is a vertical sectional view of one embodiment of my invention.

1 is the body of the valve, said body having inlet and outlet couplings 2 and 3 and a valve seat 4 and also an opening 5 opposed to the valve seat 4.

6 is a part associated with the body and usually detachable therefrom and here shown as connected to the body by a screw threaded connection. The part 6 is usually a cap having external threads engaging the internal threads of the walls of the opening 5 and having a flange 7 for engaging the outer edge of the body around such opening 5. The cap 6 is also formed with an integral outwardly extending neck 8 and with an internal passage 9 alined with the valve seat 4 and coupling 3 and opening through the outer end of the neck 8.

10 is a valve head movable toward and from the valve seat 4 and provided with a shank 11 formed with threads 12 which engage internal threads formed in the cap 6 at the lower end of the passage 9.

13 is a stem detachably connected to the shank 12 of the valve head 10 and extending through the passage 9 and being detachable from such shank and removable from the passage by an endwise movement, without removing the cap 6 from the body 1.

One of the parts 11 and 13 preferably the shank 11 is formed with a non-circular axial socket in which a part 14 at the lower end of the stem extends, such part 14 fitting the socket so that when the stem is turned the shank 11 and valve head 10 will also be turned and moved toward and from the valve seat 4.

The stem is of less diameter than the passage 9 so that there is an annular space around the stem within the passage, and the stem is formed with an integral flat annular flange or shoulder 15 located near the outer end of the passage 9. The outer end of such passage is closed by suitable means, here shown as a plug 16, threading into the passage 9, this plug preventing removal of the stem out of the passage, and a ring 17 is usually interposed between the flat inner end face of the plug 16 and the shoulder 15. The ring is composed of a hard composition of metal and rubber or fiber and the ring 17 is held against the inner end face of the plug 16, and the flange 15 is held seated against the ring 17 by means of a spring 18 coiled about the stem 13 within the passage 9 and interposed between the shoulder 15 and an annular abutment 19 integral with the cap or neck thereof and projecting into the passage 9 intermediate of the ends thereof and beneath the flange or shoulder 15, the internal diameter of such abutment 19 being greater than that of the stem 13 and the stem 13 being formed with a cylindrical enlargement 20 fitting the abutment 19.

The plug 16 is preferably provided with an upwardly extending sleeve 21 encircling the stem, such sleeve engaging the lower face of a shoulder 22 provided on the detachable handle 23 of the stem. The plug 16 is also formed intermediate of its ends with a shoulder 24 which engages the outer edge of the neck 8 around the passage 9.

Obviously upon the removal of the handle 23 from the stem 13 and the plug 16 from the neck 8, the stem can be entirely detached from the valve head and the cap 6 without removing the cap 6 from the body and also the ring 17 can be easily removed when worn and a new one inserted.

What I claim is—

1. In a valve, and in combination, a body having a valve seat and an opening through its wall opposed to the seat, a cap mounted in the opening and provided with an axial passage therethrough, an abutment in the passage intermediate of the ends thereof, a valve within the body for coacting with the valve seat, a valve-stem extending through the passage in the cap and having one end detachably connected to the valve and its opposite end provided with a handle, a closure for the outer end of the passage in the cap, said closure including a part extending a distance into the passage, a flange fixed relatively to the stem beneath the closure, a ring surrounding the stem and separable therefrom, said ring being located in the passage of the cap and disposed between the end of said closure and the opposing face of said flange, and a spring interposed between the opposing faces of the abutment and said flange for yieldingly pressing the flange into contact with the ring, and the latter into contact with the end of the closure.

2. In a valve, and in combination, a body having a valve seat and an opening through its wall opposed to the seat, a cap mounted in the opening and having an axial passage way therethrough, and an abutment in the passage intermediate of the ends thereof, a valve within the body for coacting with the valve seat, a valve-stem extending through the passage in the cap and having one end detachably connected to the valve and its opposite end provided with a handle, a closure for the outer end of the passage in the cap, a flange fixed relatively to the stem and arranged between the abutment and the said closure, a ring located within the passage in the cap and having its periphery in contact with the wall of said passage said ring being movable relatively to the stem and coacting with its upper and lower faces with the adjacent faces of said flange and closure, and a spring located between the opposing faces of the flange and the abutment.

3. In a valve, and in combination, a body provided with a valve seat and with an opening in its wall in alinement with said seat, a cap detachably mounted in said opening and having a depending portion and an outwardly extending neck portion, a valve having a shank threaded in said depending portion, said cap having an axial passage therethrough, a valve-stem extending through such passage having a handle at its outer end and a slidable engagement at its inner end with said shank, a flange on said stem, a plug for closing the outer end of the passage in the cap, a ring having a peripheral face coöperating with the wall of the passage and an upper face contacting with the end of said plug, means supported within the neck of the cap and coöperating with said flange for forcing the stem outwardly and a part also located in the neck of the cap for providing a support for the end of the spring opposite to that coöperating with the flange.

4. In a valve, and in combination, a body formed with a valve seat and with an alining opening having a threaded wall, a cap having an axial passage therethrough, a threaded part for engaging the threaded wall of said opening, a part depending therebelow interiorly threaded, and an outwardly extending neck interiorly threaded adjacent its end, an abutment located in the passage way intermediate the ends thereof and provided with an opening, a valve having a shank coöperating with the threaded portion of the depending part of the cap, a plug coöperating with the threaded portion of the neck, and including a sleeve and a shoulder for engaging the outer end of the neck, a valve-stem extending axially through the passage way in the cap and through said plug and having at one end a slidable connection with the valve-shank, a handle on the opposite end of the stem provided with a shoulder engaging the end of the sleeve, an enlargement in the valve-stem coacting with the wall of the opening in said abutment, a flange spaced apart from said enlargement and carried by the stem, a ring located entirely within the passage way in the cap and engaging the wall of said passage way, one end of said plug and a face of said flange, respectively, and a spring interposed between said abutment and the opposite face of the flange.

In testimony whereof, I have hereunto signed my name in the presence of two attesting witnesses, at Syracuse, in the county of Onondaga, in the State of New York, this 29th day of October, 1910.

JOHN B. WOODWORTH.

Witnesses:
  S. DAVIS,
  L. M. DAVIS.

---

Copies of this patent may be obtained for five cents each, by addressing the "Commissioner of Patents, Washington, D. C."